United States Patent Office 2,727,899
Patented Dec. 20, 1955

2,727,899

CERTAIN 1-CYCLOALKYL, 1-ARYL, OMEGA-C-PYRIDYL, OR C-QUINOLYL, 1-ALKANOLS, SALTS AND PROCESS

Jack Bernstein, New Brunswick, N. J., assignor to Olin Mathieson Chemical Corporation, New York, N. Y., a corporation of Virginia No Drawing. Application June 30, 1953,
Serial No. 365,287

6 Claims. (Cl. 260—297)

This invention relates to, and has for its object the provision of: (A) bases of the general Formula (I)

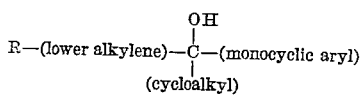

wherein R is a member of the class consisting of C-pyridyl and C-quinolyl; (B) salts thereof (addition and quaternary ammonium); and (C) methods of preparing (A) and (B). (The term monocyclic aryl includes phenyl and phenyl substituted by lower-alkyl, lower-alkoxy and halogen groups; the cycloalkyl group may also contain substituents, inter alia, lower-alkyl or lower-alkoxy; and the C-pyridyl and C-quinolyl groups represented by R may also contain substituents, inter alia, lower-alkyl groups.)

The compounds of this invention are useful as therapeutic agents, especially as antispasmodics; the preferred compounds of this invention, namely, the bases I, and addition salts thereof, being useful in the treatment of Parkinsonism.

The compounds of this invention are prepared by the method comprising interacting a Grignard reagent, R'-Mg-(halide), and a ketone of the general formula

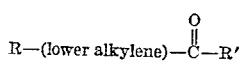

wherein R has the meaning given hereinbefore, and R' in one of the reactants, especially the R'-Mg-(halide) reactant, is cycloalkyl, and R' in the other reactant is a monocyclic aryl group, in a Grignard-reaction medium (especially anhydrous ether) and recovering the reaction product. Thus the utilizable Grignard reagents include, inter alia, compounds in which the R' group is cyclopentyl, methyl-cyclohexyl and (especially) cyclohexyl; and using the latter Grignard reagent, the following compounds of the invention (inter alia) are prepared: 1-cyclohexyl-1-phenyl-3-(2'-pyridyl)-1-propanol; 1 - cyclohexyl-1-phenyl-4-(4'-pyridyl)-1-butanol; 1 - cyclohexyl-1-phenyl-4-[2'-(5'-methyl) - pyridyl]-1-butanol; 1 - cyclohexyl-1-phenyl-2-(2'-pyridyl)-1-ethanol; 1 - cyclohexyl-1-phenyl-5-(2'-pyridyl)-1-pentanol; 1 - cyclohexyl - 1 - phenyl-3-(2'-quinolyl)-1-propanol; 1-cyclohexyl - 1 - phenyl-3-(4'-quinolyl)-1-propanol; 1-cyclohexyl-1-(p-toluyl)-4-(2'-pyridyl)-1-butanol; 1-[3' (or 4') methylcyclohexyl]-1-phenyl-3-(2'-pyridyl) - 1 - propanol; 1 - cyclohexyl - 1 - (p anisyl)-4-(2'-pyridyl)-1-butanol; 1-cyclohexyl-1-[o(m, or p)-chlorophenyl]-4-(2'-pyridyl)-1-butanol; 1-cyclohexyl-1-(p-propoxyphenyl)-4-(2'-pyridyl)-1-butanol; and 1-cyclohexyl-1-phenyl-3-[2'-(4' - propyl)-pyridyl]-1-propanol. As indicated hereinbefore the compounds of the invention are also obtainable by the alternative method comprising interacting a (monocyclic aryl)-Mg-(halide), such as phenyl magnesium halide, with a ketone reactant of the formula given hereinbefore in which R' is a cycloalkyl group [the R-(lower alkylene)  (cycloalkyl) ketones are prepared in the same manner as the reactants in which R' is (monocyclic aryl)].

The free bases I may be converted into acid-addition salts by reacting the base with the desired acid in a suitable solvent. The utilizable acids comprise: hydrobromic, boric, nitric, lactic, tartaric, citric, succinic, phosphoric, sulfuric, maleic, fumaric and (especially) hydrochloric, inter alia. The acid-addition salts may be converted to the free bases in the conventional manner, i. e., by neutralization with alkali; and the free base may be converted to other acid-addition salts.

By the addition of alkayl halides (such as ethyl bromide, methyl bromide), dialkyl sulfates (such as diethyl sulfate), aryl halides (such as benzyl chloride), or the like, there are obtained in the usual manner quaternary salts of the bases I.

The following examples are illustrative, but by no means limitative, of the invention:

EXAMPLE 1

*Preparation of 1-cyclohexyl-1-phenyl-4-(2'-pyridyl)-1-butanol and the hydrochloride thereof*

*Preparation of the base.*—To the Grignard reagent prepared from 75.0 g. magnesium turnings, 489.0 g. cyclohexyl bromide and 1.3 liters of anhydrous ether is added dropwise a solution of 500 g. of 3-(2'-pyridyl)-propyl phenyl ketone in 650 ml. of ether. A gray precipitate separates from solution. After refluxing the mixture for seven hours, the reaction mixture is cooled and slowly poured onto a solution of 400 g. of ammonium chloride in 1.3 liters of cold water. The ether phase is washed with 2 liters of 5% ammonium chloride, 1 liter of water, and dried over magnesium sulfate. After evaporation of the solvent, the residue (about 662 g.) is dissolved in 400 ml. of hexane. The resulting crystalline product, 1-cyclohexyl-1-phenyl-4-(2'-pyridyl)-1-butanol (M. P. about 89–93° C.) is recrystallized from 400 ml, of hexane; yield about 329 g. (M. P. about 90–95° C.).

*Preparation of the hydrochloride.*—304 g. of the base is dissolved in 250 ml. of absolute ethyl alcohol and treated with one equivalent of hydrogen chloride dissolved in 300 ml. of absolute alcohol. The resulting solution is diluted with 700 ml. of ether; a colorless product slowly separates. After cooling, the precipitate is filtered and dried; yield about 298 g., M. P. about 164–167° C. Recrystallization of the crude hydrochloride from 1.1 liters of isopropyl alcohol yields about 270 g. of colorless product, the hydrochloride of 1-cyclohexyl-1-phenyl-4-(2'-pyridyl)-1-butanol; M. P. about 172–173° C. (dec.).

*Alternative method of preparing the base.*—A Grignard reagent is prepared from 102 g. of cyclohexyl bromide and 15.5 g. of magnesium turnings in 400 ml. of anhydrous ether. The solution is filtered through glass wool to remove unreacted magnesium and then added dropwise with vigorous stirring to a solution of 112.5 g. of 3-(2'-pyridyl)-propyl phenyl ketone in 400 ml. of anhydrous ether. The heat of reaction causes the ether to reflux gently and a solid precipitates out. After all the Grignard reagent has been added (about one hour) the reaction mixture is refluxed an additional 15 minutes, and then poured into ice and water. The mixture is acidified to pH 2 with hydrochloric acid, and the ether layer is separated. It is washed once with 5% hydrochloric acid, and the washing combined with the original aqueous layer. The combined aqueous layers are then made alkaline with aqueous ammonia and extracted three times with 500 ml. of ether. This ether extract is dried over anhydrous potassium carbonate and then concentrated.

Since some solid separates in the residue upon cooling, hexane is added; and the solid is filtered off, the product being a white solid melting at about 98–99° C. The filtrate is concentrated and then distilled under reduced pressure to remove unreacted pyridyl propyl phenyl ketone. The residue solidifies to give additional crude product, M. P. about 90–92° C. The latter crop is combined with the earlier crop which melts at 98–99° C. and the combined crops are crystallized twice from hexane to give the product, 1-cyclohexyl-1-phenyl-4-(2'-pyridyl)-1-butanol, M. P. about 99–100° C.

EXAMPLE 2

Using a molar equivalent of 3-(2'-quinolyl)-propyl phenyl ketone or 3-(4'-pyridyl)-propyl phenyl ketone in place of 3-(2'-pyridyl)-propyl phenyl ketone in Example 1, yields 1-cyclohexyl-1-phenyl-4-(2'-quinolyl)-1-butanol and 1-cyclohexyl-1-phenyl-4-(4'-pyridyl)-1-butanol, respectively.

EXAMPLE 3

*Preparation of the methobromide quaternary salt of 1-cyclohexyl-1-phenyl-4-(2'-pyridyl)-1-butanol*

A suspension of 18.0 g. of 1-cyclohexyl-1-phenyl-4-(2'-pyridyl)-1-butanol hydrochloride (obtained as described in Example 1) in 75 ml. of water is treated with a solution of 3.0 g. of sodium hydroxide in 20 ml. of water, the resulting free base is extracted with ether and dried over magnesium sulfate. After evaporation of the solvent, the residual solid is dissolved in 100 ml. of acetone and treated with a solution of 9.0 g. (0.095 mole) of methyl bromide in 36 ml. of acetone. After standing for several days at room temperature, the colorless solid is filtered and dried; yield about 20.5 g. (98%); M. P. about 190–191° C. This material is recrystallized from 60 ml. of absolute alcohol; yield about 16.8 g., M. P. about 190–191° C.

Using molar equivalents of ethyl iodide or benzyl chloride in place of methyl bromide in the above example, there are obtained the corresponding ethoiodide and benzyl chloride, respectively, of 1-cyclohexyl-1-phenyl-4-(2'-pyridyl)-1-butanol.

EXAMPLE 4

Using a molar equivalent of 2-(2'-pyridyl)-ethyl ketone in place of 3-(2'-pyridyl)-propyl phenyl ketone in Example 1, there is obtained 1-cyclohexyl-1-phenyl-3-(2'-pyridyl)-1-propanol and the hydrochloride thereof.

EXAMPLE 5

*Preparation of 1-cyclohexyl-1-phenyl-4-(3'-pyridyl)-1-butanol*

A. *Ethyl 3-(3'-pyridyl)-3-ketobutyrate.*—A solution of 279 g. of ethyl α-nicotinoyl-succinate in 2500 ml. of 10% hydrochloric acid is refluxed for approximately four hours (until the evolution of carbon dioxide had ceased). The solution is then concentrated to dryness under reduced pressure, and the residue of crude 3-(3'-pyridyl)-3-ketobutyric acid hydrochloride is esterified by refluxing for six hours with two liters of ethanolic hydrogen chloride. The alcohol is removed by distillation; and the residue is dissolved in water, made alkaline with potassium carbonate, and extracted with ether. The ether extracts are dried over anhydrous magnesium sulfate and concentrated. The residue is then fractionated under reduced pressure to yield ethyl 3-(3'-pyridyl)-3-ketobutyrate, boiling at about 135–145° C. (at 0.2 mm.).

B. *Ethyl 3-(3'-pyridyl)-butyrate.*—A mixture of 120 g. of ethyl 3-(3'-pyridyl)-3-ketobutyrate, 300 g. of amalgamated zinc and 300 ml. of concentrated hydrochloric acid is refluxed for six hours. An additional 300 ml. of 15% hydrochloric acid is then added, and the reaction mixture refluxed for an additional three hours. The reaction mixture is then cooled, the aqueous layer decanted from the unreacted zinc and concentrated to dryness. The residue is dissolved in water and an excess of hydrogen sulfide passed into the solution while it is gradually made alkaline with aqueous sodium hydroxide. The precipitated zinc sulfide is filtered off, and the filtrate acidified with aqueous hydrochloric acid. The solution is then concentrated to dryness, and the crude residue containing sodium chloride is refluxed for six hours with ethanolic hydrogen chloride to esterify the 3-(3'-pyridyl)-butyric acid. The alcohol is then distilled off, the residue dissolved in water and the aqueous solution made alkaline with potassium carbonate. The mixture is extracted with ether and the ether extracts concentrated after drying over anhydrous magnesium sulfate. The residue is fractionated under reduced pressure to give the desired ethyl 3-(3'-pyridyl)-butyrate, boiling at about 100–110° C. (at 0.2 mm.).

C. *3-(3'-pyridyl)-propyl phenyl ketone.*—To a solution of 58 grams of ethyl 3-(3'-pyridyl)-butyrate in 2 liters of anhydrous ether (cooled to −70° C.) there is added dropwise, with vigorous stirring a solution of the Grignard reagent prepared from 94 grams of bromobenzene and 14.5 g. of magnesium in 1 liter of ether. After the addition, which required about thirty minutes, the reaction mixture is poured slowly into a solution of 200 g. of ammonium chloride in 1 liter of water. The ether layer is washed with aqueous ammonium chloride solution, dried over anhydrous magnesium sulfate and concentrated. The residue is fractionally distilled under reduced pressure to yield the desired ketone, 3-(3'-pyridyl)-propyl phenyl ketone, boiling at about 165–175° C. at 2 mm. and leaving a solid residue of 1,1-diphenyl-4-(3'-pyridyl)-butanol.

D. *Preparation of the base and hydrochloride thereof.*—Using a molar equivalent of the 3-(3'-pyridyl)-propyl phenyl ketone in place of the 3-(2'-pyridyl)-propyl phenyl ketone in Example 1, there are obtained 1-cyclohexyl-1-phenyl-4-(3'-pyridyl)-1-butanol and the hydrochloride thereof.

EXAMPLE 6

Using a molar equivalent of cyclopentyl bromide in Example 1 in place of cyclohexyl bromide, there are obtained 1-cyclopentyl-1-phenyl-4-(2'-pyridyl)-1-butanol and the hydrochloride thereof.

The invention may be variously otherwise embodied within the scope of the appended claims.

I claim:

1. Compounds of the class consisting of: bases of the general formula

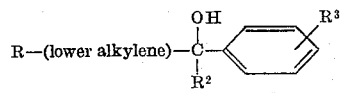

wherein R is a member of the class consisting of C-pyridyl groups and C-quinolyl groups, $R^2$ is a cycloalkyl group containing 5 to 6 nuclear carbon atoms, and $R^3$ is a member of the class consisting of hydrogen, lower-alkyl, lower-alkoxy and halogen groups; and salts thereof.

2. An acid-addition salt of a base of the general formula

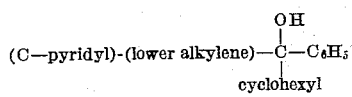

3. An acid-addition salt of a base of the general formula

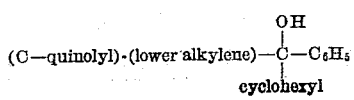

4. Compounds of the general formula

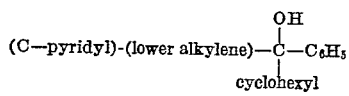

5. The method which comprises interacting a Grignard reagent, R'—Mg—(halide), and a ketone, R—(lower alkylene)

in a Grignard reaction medium, and recovering the reaction product, R being a member of the class consisting of C-pyridyl groups and C-quinolyl groups, and R' in one of the reactants being a cycloalkyl group containing 5 to 6 nuclear carbon atoms and R' in the other reactant being a member of the class consisting of phenyl, (lower alkyl)-phenyl, (lower alkoxy)-phenyl and halo-phenyl groups.

6. The method which comprises interacting a cyclohexyl-magnesium halide and a ketone, (C-pyridyl)-(lower alkylene)

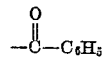

in anhydrous ether; and recovering the reaction product.

No references cited.